US005349732A

United States Patent [19]

Spence

[11] Patent Number: 5,349,732

[45] Date of Patent: Sep. 27, 1994

[54] TOOL FOR THE INSTALLATION AND REMOVAL OF VALVES FROM INTERNAL COMBUSTION ENGINES

[76] Inventor: John O. Spence, P.O. Box 722, Acton, Calif. 93510

[21] Appl. No.: 31,910

[22] Filed: Mar. 16, 1993

[51] Int. Cl.[5] ........ B23P 19/04

[52] U.S. Cl. ........ 29/221

[58] Field of Search ........ 29/219–221, 29/227, 268; 254/10.5

[56] References Cited

U.S. PATENT DOCUMENTS 1,370,397 3/1921 Axelton .
1,429,000 9/1922 Varble .
1,607,153 11/1926 Feather .
1,776,159 9/1930 Kulp et al. ........ 29/221
1,890,466 12/1932 Lemmerman ........ 29/221
1,908,785 5/1933 Pioch .
1,924,246 8/1933 Kulp et al. .
1,928,219 9/1933 Church .
2,519,024 8/1950 Collett .

*Primary Examiner*—Robert C. Watson
*Attorney, Agent, or Firm*—Louis L. Dachs

[57] ABSTRACT

The invention is a tool for removing and installing valve springs in an overhead valve engine of the type having a stud adjacent the valve spring. In detail, the tool is a locking type pliers having a first jaw with an aperture therethrough for engaging the stud and a second jaw for engaging the valve spring, the second jaw having an opening therein sufficient to allow the valve retainer to pass therethrough. Thus that when the tool is installed with the first jaw positioned with the stud extending through the aperture and the second jaw positioned over the valve spring, the pliers can be actuated to a locked position causing the second jaw to compress the spring with the first jaw reacting the force applied to compress the valve. spring. Upon compression of the spring the valve retainer is freed from the valve spring retaining cap and can be easily removed.

11 Claims, 3 Drawing Sheets

TOOL FOR THE INSTALLATION AND REMOVAL OF VALVES FROM INTERNAL COMBUSTION ENGINES

BACKGROUND OF THE INVENTION

1. Field of the Invention

The invention relates to the field of hand tools and, in particular, to a tool to install and remove the valves springs from the heads of overhead valve internal combustion engines.

2. Description of Related Art

A typical valve for an internal combustion engine includes a valve face and a stem that has a notched end. The valve springs are positioned about the valve stem with a cap placed thereover. The valve springs are held under a compression load by a split ring retainer (valve keeper) mounted between a recess in the cap and the underside of the notch. Thus in order to install or remove the valve springs, the springs must be further compressed so that the retainer can be removed.

Since the inception or the internal combustion engine there have been numerous tools developed to aid in the removal of the valve spring. For example U.S. Pat. No. 1,052,941, "Tool For Compressing Valve Springs" by C. Nyberg discloses a simple pliers with forked jaws that can be wedged "under" the ends of the valve spring and then closed to compress the spring. The main disadvantage of this simple device is that it would be difficult to insert about a heavy duty valve spring. Additionally, and although valve springs are made of high strength material, it is possible to damage the spring.

U.S. Pat. No. 1,370,397, "Valve Remover" by C. M. Axelton discloses a lever having a handle on one end, an opposite end terminating in a fork like member, and an aperture located therebetween. In operation, the forked end is attached to the head by means of a hook with the aperture aligned with the valve stem. The lever is thereafter rotated about the forked end compressing the valve spring. This causes the valve stem to extend through the aperture allowing the valve spring keeper to be removed. The problem with this particular device is that it must be physically secured to the head making its use a somewhat time consuming operation. U.S. Pat. No. 1,429,000, "Valve Spring Compressor" by P. L. Varble discloses a tool for removing valves from "flat head" engines wherein the valves are located in the side of the engine block. It is a simple "reverse clamp" type pliers wherein one jaw is positioned on the side of the engine block for support (on the edge of the recess for the push rod/valve spring assemblies) and the other jaw is inserted under the valve spring. Compressing the handles in this reverse clamp causes the jaws to move apart compressing the valve spring. The main limitation of this device is that it is only useful on "flat head" engines.

An improvement to the Varble device can be found in U.S. Pat. No. 1,607,153 "Spring Compressor And Carrier Holding Tool" by D. C. Feather in that it can be used for both overhead valve and flat head engines. Feather discloses a simple position locking pliers wherein lever arms replace the typical jaws. Separate jaws are pivotally attached to the handles and also engage the lever arms. Thus the jaws can be inserted about the valve spring whereafter the "closing" of the lever arms causes the jaws to compress the valve spring. However this device requires that at least one of the jaws be jammed into the spring that may cause damage thereto. U.S. Pat. No. 1,928,219 "Compression Type Valve Tool" by A. E. Church discloses an improvement to the Feather design in that interchangeable jaws are provided allowing the tool to be used with a wide variety of engine designs.

U.S. Pat. No. 1,908,785, "Valve Spring compressor" by W. F. Pioch and U.S. Pat. No. 1,924,246 "Spring Compressor" by H. W. Kulp, et al, U.S. Pat. No. 2,519,024, "Overhead Valve Spring Remover" by H. E. Collett just disclose over-center type locking pliers with forked shape jaws that function in a conventional manner.

Finally, U.S. Pat. No. 3,363,302, "Valve Spring Tool Device" by R. D. Haselmo, et al. is a lever type device which can be used with overhead valve engines that have rocker arm mounting studs in proximity to the valve. The Haselmo, et al. device is a flat lever having a forked first end, an actuation arm at the second end, and an aperture therebetween. The lever arm is positioned so that the forked end engages the valve spring and is thereafter secured to the head by placing the lever arm over the mounting stud so that the stud extends through the oversize aperture. A threaded nut is used to secure it thereto. With the aperture being oversize, the lever can be rotated about the stud causing the forked end to compress the valve spring. This device has the distinct disadvantage of requiring the time consuming step of attaching the device to the head prior to removal of the valve spring and it does not lock the valve spring in the compressed position.

Thus, it is a primary object of the invention to provide a tool for the installation and removal of valve springs from internal combustion engines.

It is another primary object of the invention to provide a tool for the installation and removal of valve springs from internal combustion engines having overhead valves.

It is a further object of the invention to provide a tool for the installation and removal of valve springs from internal combustion engines having overhead valves that does not require clamping or otherwise fastening the device to the engine.

It is a still further object of the invention to provide a tool for the installation and removal of valve springs from internal combustion engines having overhead valves that can lock the valve spring in a compressed position so as to allow easy removal of the valve keeper.

SUMMARY OF THE INVENTION

In most overhead valve engines, particularly those engines having cam shafts mounted in the blocks that actuate the valves by means of push rods have studs mounted in the heads for attaching the valve train (rocker arm assemblies). In general, the valve assembly includes a valve, having a valve face and a stem with an end including a notch therein. Mounted about the valve are nested valve springs having a retaining cap thereover. The retaining cap has a recess in which the notch in the valve stem extends. A valve retainer or "keeper" when installed in the recess of the retaining cap and about the notch retains the spring in a partially compressed position. Such cylinder head designs are quite common and, thus, need not be discussed in more detail.

The subject invention is a tool for removing and installing such valve springs in overhead valve engines that have a stud adjacent the valve spring. In detail, the tool is a locking type pliers having a first jaw with an aperture therethrough for engaging the stud and a second jaw for compressing the valve spring incorporates an opening therein sufficient to allow the valve retainer to pass therethrough. Thus, when the first jaw is positioned with the stud extending through the aperture and the second jaw is positioned over the valve spring, the tool can be actuated to a locked position causing the second jaw to compress the spring with the first jaw reacting the force applied to compress the valve spring through the stud.

Because the tool must be used from the stud side, the first jaw must be longer than the second jaw in order to prevent interference. Preferably the second jaw incorporates an upward extending tubular member having the aperture located therein. This provides for the reaction loads to be spread along a portion of the length of the stud. In fact, the stud, is typically only partially threaded from the top down and the tubular member is preferably equal to the length of the un-threaded portion of the stud. Furthermore it is also preferable to have the first and second jaws detachably mountable to the tool. This allows the same tool to be used on a variety of engines by simply replacing the jaws with an another size.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

DESCRIPTION OF THE PREFERRED EMBODIMENT

Figure 1:
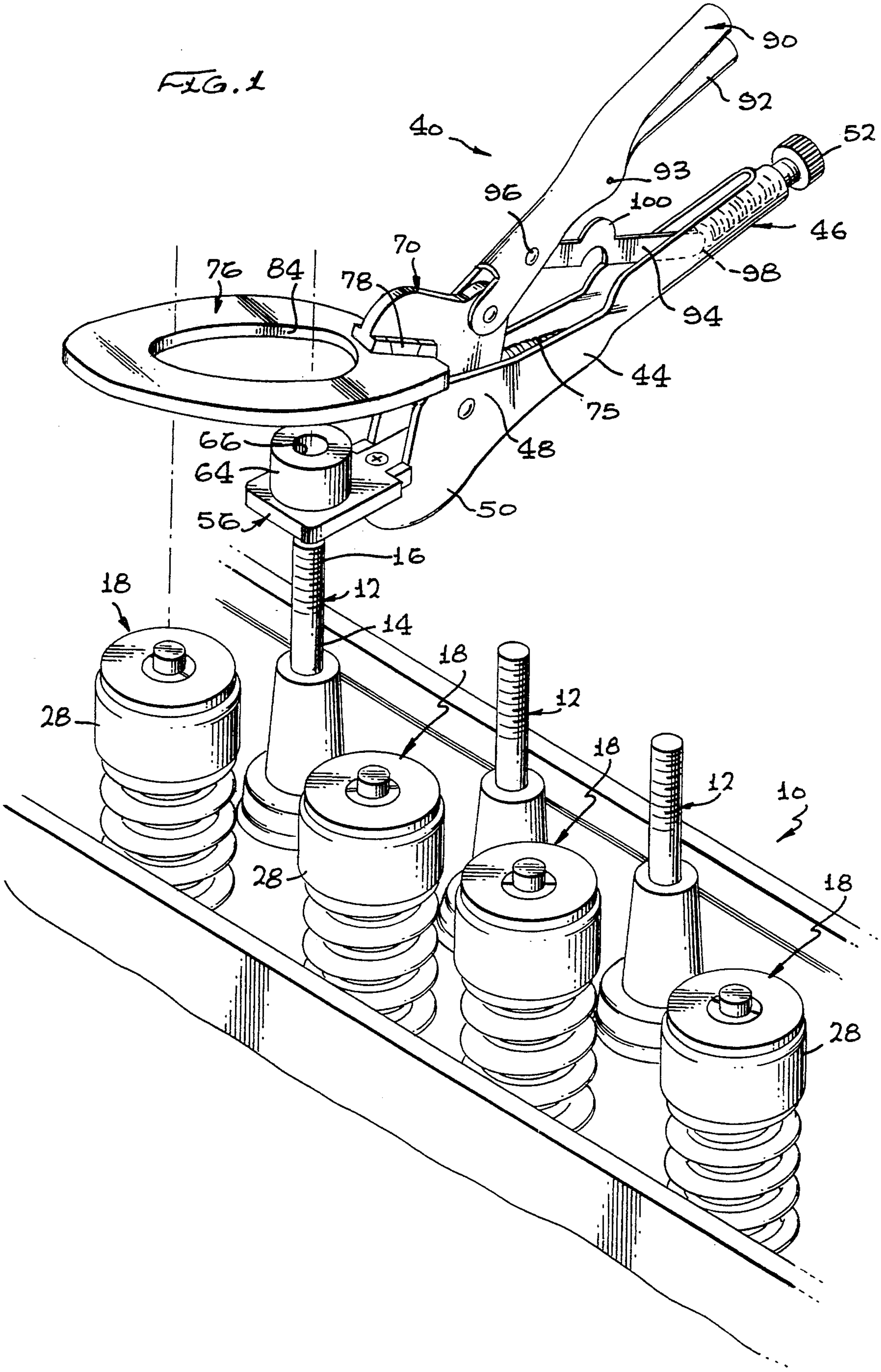
FIG. 1 is a partial view of an overhead valve type cylinder head for an internal combustion engine and the subject tool.
Figure 2:
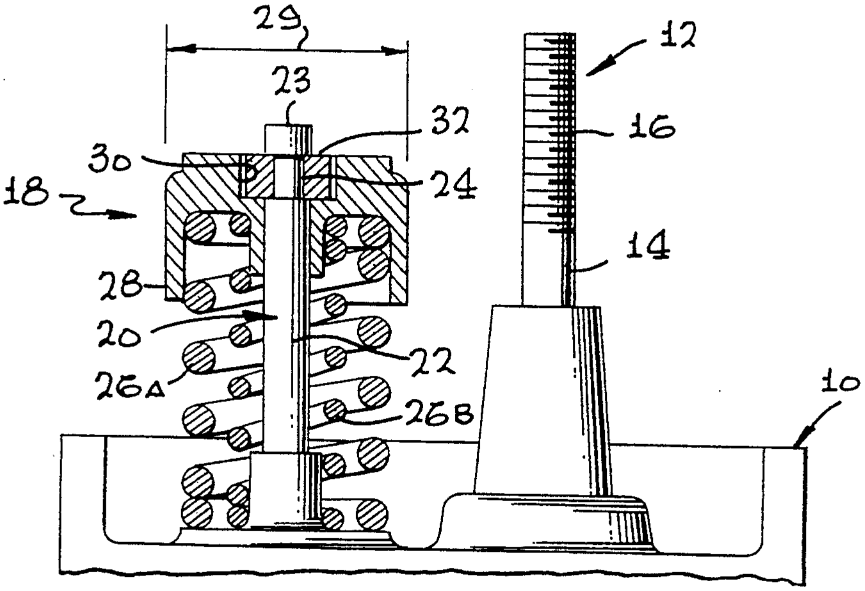
FIG. 2 is a partial cross-sectional view of the cylinder head shown in FIG. 1 illustrating the a typical valve assembly.

Referring to FIGS. 1 and 2, an internal combustion engine cylinder head generally indicated by numeral 10 is depicted. One of the studs, indicated by numeral 12, for mounting the overhead valve train (not shown) extends upward from the head and has a lower un-threaded portion 14 and an upper threaded portion 16. In proximity thereto is a valve assembly 18 that includes a valve 20. The valve 20 includes a valve stem 22 having an end 23 with a notch 24 therein. Mounted about the valve 20 are nested valve springs 26A and 26B having a retaining cap 28 thereover. The retaining cap 28 includes a recess 30 in which the notch 24 in the valve stem 22 extends with has an overall diameter indicated by numeral 29. A split valve retainer or "valve keeper" 32 is mounted within the recess 30 and about the notch 24 and retains the springs 26A and 26B in a partially compressed condition. Such cylinder head designs are quite common and, thus, need not be discussed in more detail. The subject tool is designed to aid in the installation and removal of such valve springs, thus allowing the removal of the valve from the combustion chamber side of the head (not shown.)

Figure 3:
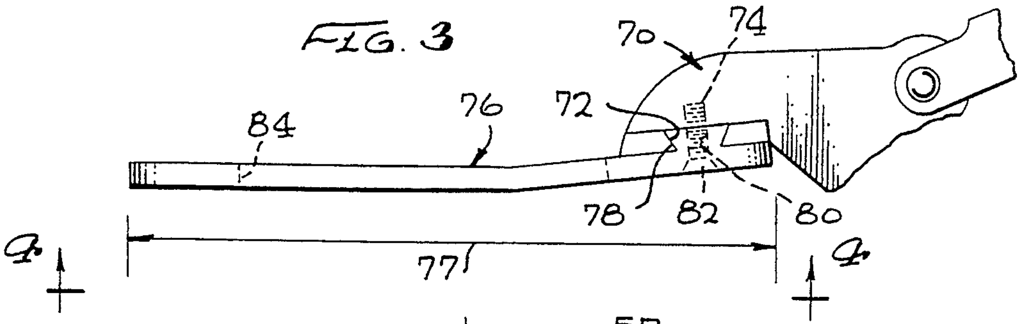
FIG. 3 is a partial side view of the tool shown in FIG. 1, particularly illustrating the upper removable jaw 2.
Figure 5:
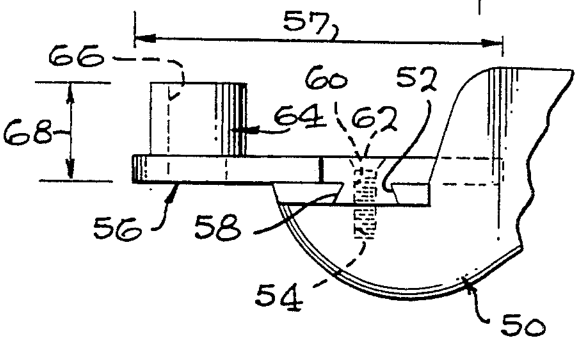
FIG. 5 is a partial side view of the tool shown in FIG. 1, particularly illustrating the lower removable jaw.
Figure 4:
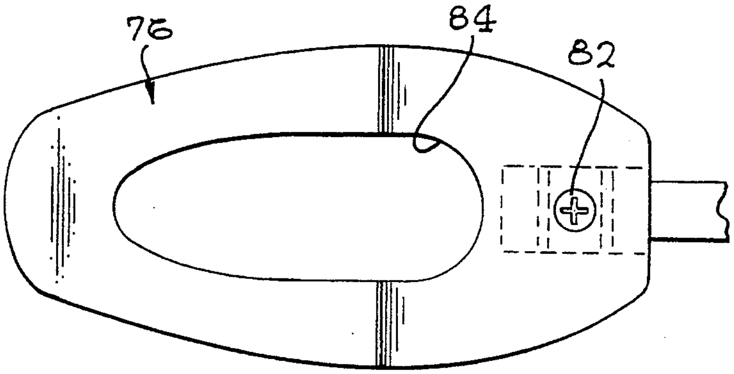
FIG. 4 is a view of the tool shown in FIG. 3 taken along the line 4—4.

Still referring to FIG. 1 and additionally to FIGS. 3-5, the tool, generally indicated by FIG. 40, is basically a locking type pliers. As illustrated the tool is based on a commercially available plier design marketed under the trademark VICE GRIP TM manufactured by the Peterson Manufacturing Company De Witt, Nebr. The tool 40 includes a first handle 44 having an end 46, channel portion 48 and jaw mounting member 50. An adjustment screw 52 is mounted at the end 46 and extends into the channel 46, the purpose of which will be subsequently discussed.

The first jaw mounting member 50 includes a wedge shaped slot 52 having a threaded fastener hole 54 at the bottom thereof. A jaw 56, having a length 57, is removable mounted to the jaw mounting member 50 by means of a wedge shaped member 58 attached thereto. The wedge shaped member 58 includes a fastener hole 60 therethrough and is adapted to mate with the wedge shaped slot 52 and is releasable held to the jaw portion 50 by means of a screw 62. The jaw 56 further includes a tubular member 64, having an aperture 66 therethrough, with a length indicated by numeral 68. The length 68 of the tubular member 64 should be equal or less than the un-threaded portion 14 of the stud 12.

A second jaw mounting member 70 is pivotally attached to the channel portion 48 of the first handle 44. The member 70 includes a wedge shaped slot 72 having a threaded fastener hole 74 at the bottom thereof. The member 70 is spring biased toward the handle 44 by means of spring 75. A second jaw 76, with a length 77, includes a wedge shaped member 78, having a fastener hole 80 therethrough. The wedge shaped member 78 is adapted to mate with the wedge shaped slot 72 and it releasable held to the jaw portion 70 by means of a screw 82. The second jaw 76 includes a slot 84 therein wide enough to fit over the stud 12, yet smaller than the diameter 29 of the retaining cap 28.

A second channel shaped handle 90 is pivotally attached to the second jaw portion 70. A lever 92 is pivotally mounted to the handle 90 at or near its center 93, the purpose of which will be subsequently discussed. A member 94 is pivotally attached at a first end 96 to the handle 90 and its second or opposite end 98 abuts the end of the screw 52 in the first handle 44. The member 94 also includes a cam surface 100, the function of which will be subsequently discussed.

Thus it can be seen that the handles 44 and 90, jaw portion 70, and member 94 combine to act as a four-bar linkage over center latching or locking mechanism, biased by the spring 75 to the latched position with the distance 104 between the jaw portions 50 and 70 determined by the position of the screw 52. As illustrated in FIG. 5, once locked in place, the lever arm 92 can be used to "break" the over center locked position of the jaws. This is accomplished by griping the lever arm 92 so that it rotates about the pivot point 93 causing it to engage the cam 100 on the member 94 in turn forcing the handle 90 to move away from the handle 44.

Figure 6:
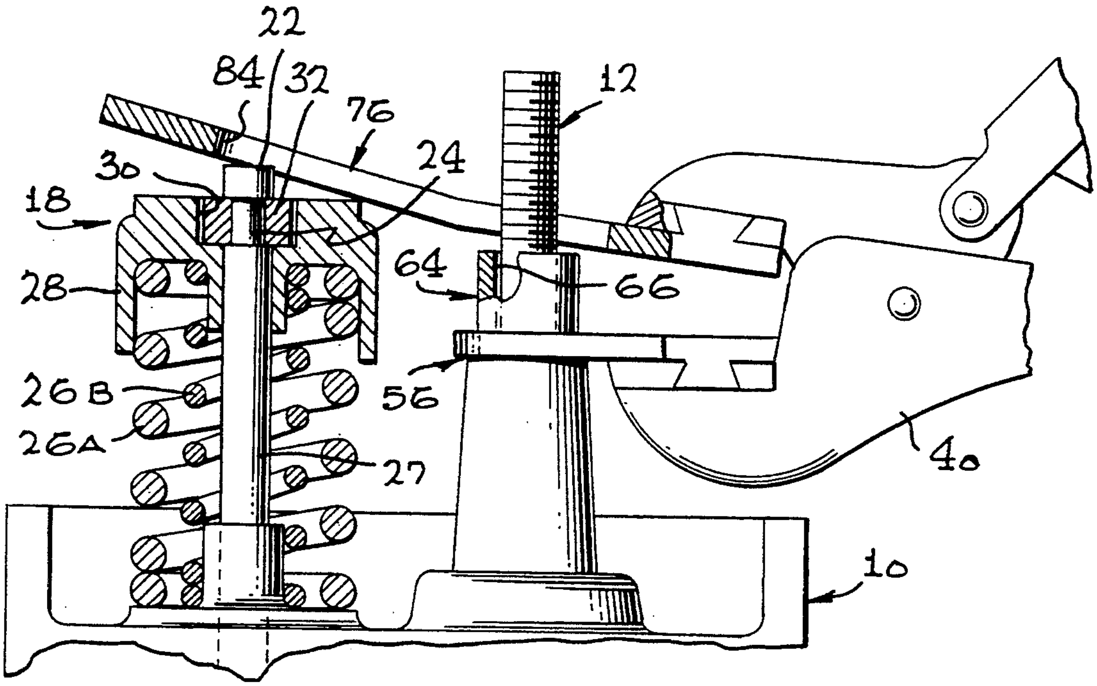
FIG. 6 is a view similar to FIG. 2 illustrating the tool installed on the cylinder head in a position to compress the valve springs and release the valve retainer.
Figure 7:
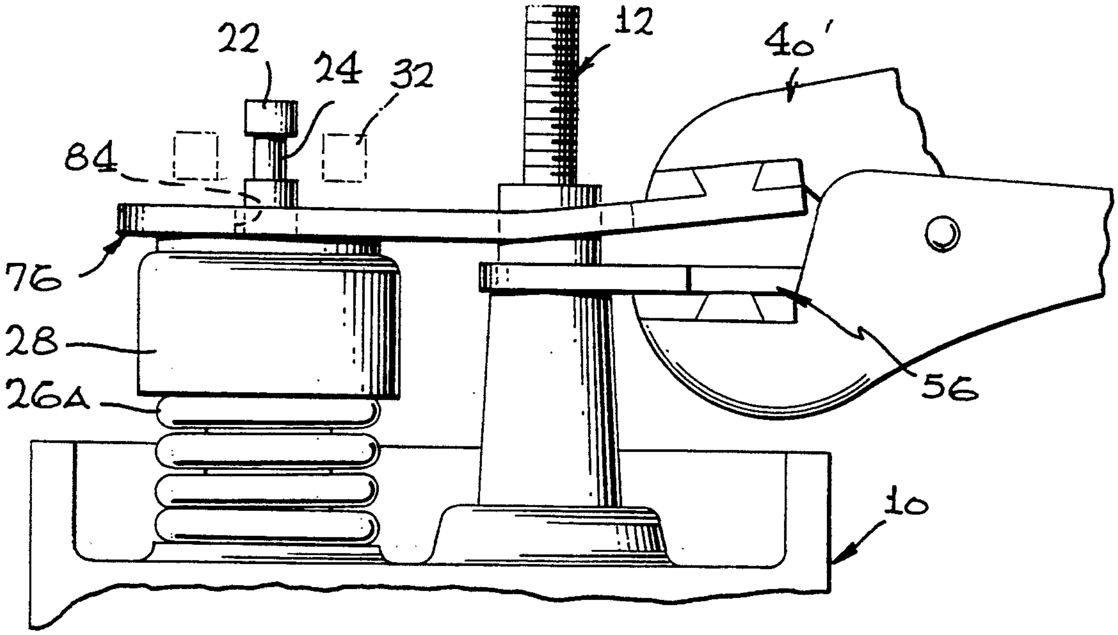
FIG. 7 is a view similar to FIG. 6 illustrating the tool installed on the cylinder head and actuated to compress the valve springs releasing the valve retainer.

Referring to FIGS. 1, 6 and 7, in operation, the tool 40 is positioned such that the aperture 66 in the tubular member 64 of the jaw insert 56 is over the stud 12 and the jaw insert 76 is above the valve assembly 18. The tool is then actuated to the "locked" position (particularly illustrated in FIG. 7 and indicated by numeral 40') causing the jaw 76 is close down over the valve assembly 18, forcing the cap 28 downward compressing the springs 26A and 26B. Continued closing of the jaws 56 and 76 will eventually cause the tool to lock with jaw 56 reacting the loads into the stud 12. Note that by having the length 68 of the tubular member 64 equal to the un-threaded portion 14 of the stud 12, the reaction loads are spread thereover and the tool does not tend to rotate. At this point the operator can remove his hand from the tool and, thereafter, will have both hands free to remove the valve springs 28A and 28B. Because the keeper 32 is retained in the notch 24 of the valve stem 22 it remains in its original position and becomes free of the recess 30 and can, therefore, be easily removed. Thereafter the tool can be unlocked by actuating the lever 92. The valves will no longer be under a compression load and can be just lifted off the head.

It should be understood that the tool need not have replaceable jaw inserts, however, by so doing it can be used on a great many engines, rather than just a few. Additionally the tool is not dependent upon the locking mechanism described; most all the locking pliers discussed in the section of the background of the invention could be used with little or no modification. In fact, the tool does not have to be a locking type, although it makes the it easer to use in that both hands are freed to remove the valve keeper once the tool is locked in place.

While the invention has been described with reference to a particular embodiment, it should be understood that the embodiment is merely illustrative as there are numerous variations and modifications which may be made by those skilled in the art. Thus, the invention is to be construed as being limited only by the spirit and scope of the appended claims.

INDUSTRIAL APPLICABILITY

The invention has applicability to the field of hand tools and in particular tools for use on eternal combustion engines with overhead valves.

I claim:

1. A tool for removing and installing valve springs an overhead valve engine, the overhead valve engine having a stud adjacent the valve spring, the tool comprising a pair of locking type pliers having a first jaw having a tubular member with an aperture therethrough for engaging the stud, a second jaw for engaging the valve spring, said second jaw having an opening therein sufficient to allow the valve retainer to pass therethrough, such that when said first jaw is positioned with the stud extending through said aperture and said second jaw is positioned over the valve spring, said tool can be actuated to a locked position causing said second jaw to compress the spring with said first jaw reacting the force applied to compress the valve spring.

2. The tool as set forth in claim 1 wherein the stud on the overhead valve engine are only partially threaded and said first jaw includes a tubular member having a length generally equal to the length of the un-threaded portion of the stud and said aperture is located therein.

3. The tool as set forth in claim 2 wherein the length of said first jaw is less than said second jaw.

4. The tool as set forth in claim 3 wherein said opening in said second jaw is a elongated slot extending therethrough.

5. The tool as set forth in claim 1, or 2, or 3, or 4 wherein said first and second jaws are removable mounted to said pliers.

6. A tool for removing and installing valve springs in an overhead valve engine, the overhead valve engine having a stud adjacent the valve spring, the tool comprising a pair of locking type pliers having a first jaw with an aperture therethrough adapted to engage the stud, a second jaw for engaging the valve spring, said second jaw having an opening therein sufficient to allow the valve retainer to pass therethrough, and first and second handles coupled to said first and second jaws, respectively, said handles pivotally attached to each such that when said handles are pivoted toward each other said first and second jaws simultaneously move toward each other, such that when said first jaw is positioned with the stud extending through said aperture and said second jaw is positioned over the valve spring, said tool can be actuated by pivoting said handles toward each other causing said second jaw to move toward said first jaw to compress the spring with said first jaw reacting the force applied to compress the valve spring.

7. The tool as set forth in claim 6 wherein said first jaw includes a tubular member and said aperture extends therethrough.

8. The tool as set forth in claim 7 wherein the stud on the overhead valve engine are only partially threaded and said first jaw includes a tubular member having a length generally equal to the length of the un-threaded portion of the stud and said aperture is located therein.

9. The tool as set forth in claim 8 wherein the length of said first jaw is less than said second jaw.

10. The tool as set forth in claim 9 wherein said opening in said second jaw is a elongated slot extending therethrough.

11. The tool as set forth in claim 6, or 7, or 8, or 9, or 10 wherein said first and second jaws are removable mounted to said pliers.

* * * * *